United States Patent
Fukui et al.

(10) Patent No.: US 7,792,553 B2
(45) Date of Patent: Sep. 7, 2010

(54) WIRELESS SENSOR DEVICE

(75) Inventors: Suguru Fukui, Neyagawa (JP); Teruki Hatatani, Osaka (JP); Yuji Takada, Kyoto (JP)

(73) Assignee: Panasonic Electric Works Co., Ltd., Kadoma-shi, Osaka (JP)

( * ) Notice: Subject to any disclaimer, the term of this patent is extended or adjusted under 35 U.S.C. 154(b) by 96 days.

(21) Appl. No.: 10/586,357

(22) PCT Filed: Nov. 18, 2005

(86) PCT No.: PCT/JP2005/021640

§ 371 (c)(1),
(2), (4) Date: Jul. 17, 2006

(87) PCT Pub. No.: WO2006/057322

PCT Pub. Date: Jun. 1, 2006

(65) Prior Publication Data

US 2007/0159235 A1    Jul. 12, 2007

(30) Foreign Application Priority Data

Nov. 25, 2004   (JP) .............................. 2004-341074

(51) Int. Cl.
*H04B 1/38* (2006.01)
(52) U.S. Cl. ..................................... 455/574; 455/41.1
(58) Field of Classification Search ................ 455/41.1, 455/522, 69, 67.11, 126, 68, 127.1, 572, 455/574; 340/567, 541, 555, 565; 327/142, 327/143, 198, 530, 545, 546, 108, 544, 185, 327/50; 250/338.3, 338.1, 336.1, 338.2, 250/339.14, 342, 221
See application file for complete search history.

(56) References Cited

U.S. PATENT DOCUMENTS 4,982,176 A * 1/1991 Schwarz ..................... 340/567

(Continued)

FOREIGN PATENT DOCUMENTS

CN        1403786 A       3/2002

(Continued)

OTHER PUBLICATIONS

Office Action dated Mar. 21, 2008, issued in CN 20050003203.5.

*Primary Examiner*—Lana N Le
*Assistant Examiner*—Ping Y Hsieh
(74) *Attorney, Agent, or Firm*—Edwards Angell Palmer & Dodge LLP

(57) ABSTRACT

A wireless sensor device including a sensor configured to sense a target object and provide a sensor signal of varying levels indicative of condition of the target object, a signal processing circuit configured to amplify the sensor signal and provide an amplified electric analog signal, and a detection circuit configured to receive the amplified analog signal and provide a detection output when the electric analog signal goes beyond a predetermined detection threshold. A radio transmitter transmits a radio detection signal in response to the detection output. A power supply is configured to provide an electric power to the signal processing circuit and the radio transmitter and includes a power generating element which converts an external energy into the electric power to be accumulated in the power supply. A controller activates the radio transmitter only in response to the detection output, permitting the radio transmitter to generate the radio detection signal.

3 Claims, 4 Drawing Sheets

U.S. PATENT DOCUMENTS

| | | | | |
|---|---|---|---|---|
| 5,598,066 A | * | 1/1997 | Wiesemann et al. | 315/159 |
| 5,999,830 A | * | 12/1999 | Taniguchi et al. | 455/574 |
| 6,275,712 B1 | * | 8/2001 | Gray et al. | 455/522 |
| 6,356,741 B1 | * | 3/2002 | Bilotti et al. | 455/90.1 |
| 6,677,589 B2 | * | 1/2004 | Hironaka et al. | 250/338.3 |
| 7,154,095 B2 | * | 12/2006 | Luck et al. | 250/347 |
| 7,193,201 B2 | * | 3/2007 | Motte | 250/214 R |
| 2004/0000713 A1 | | 1/2004 | Yamashita et al. | |

FOREIGN PATENT DOCUMENTS

| | | |
|---|---|---|
| EP | 0 390 666 A1 | 10/1990 |
| EP | 1 178 454 A1 | 2/2002 |
| JP | 2004-24551 | 1/2004 |

\* cited by examiner

WIRELESS SENSOR DEVICE

BACKGROUND OF THE INVENTION

1. Field of the Invention

The present invention is directed to a wireless sensor device, and more particularly to such a wireless device including a power generating element that converts an external energy into an electric power for transmitting a sensed result as a radio signal.

2. Description of the Related Art

Japanese Patent Publication No. 2004-24551 discloses a self-contained sensing system including a power generating means for transmitting a sensed result. The system includes a sensor for sensing a temperature, an acceleration, or infrared ray to provide a sensor signal indicative of a sensed analog value, and an A/D converter which converts the sensor signal into digital data. The digital data are processed by a microprocessor so as to be transmitted through a radio transmitter as a radio signal. A solar cell is included as the power generating means in order to supply an operating power to the A/D converter, the microprocessor, and the radio transmitter. Because of that the solar cell is not expected to constantly generate sufficient power to keep the system operative, the system requires a power regulator which enables operation only while much power is being generated at the solar cell in order to transmit a reliable sensor result. Also because of that the radio transmitter along with the A/D converter consumes relatively large electric power, the system suggests the use of a wireless transmission technology generally known as UWB (Ultra Wide Band) transmission which operates at a low power. However, there is still a need of minimizing the operating power in the wireless sensor system, particularly in case that the A/D converter is not necessary and only one-bit information is sufficient as the sensor result, in order to keep a reliable sensing operation over an extended period of time while relying upon the power generator of limited power generating capacity.

SUMMARY OF THE INVENTION

In view of the above problem, the present invention has been accomplished to provide a wireless sensor device which is less power consuming and is capable of operating over a prolonged period of time for providing a reliable sensor result. The wireless sensor device includes a sensor configured to sense a target object and provide a sensor signal of varying levels indicative of condition of the target object, a signal processing circuit configured to amplify the sensor signal and provide an amplified electric analog signal, and a detection circuit configured to receive the amplified analog signal and provide a detection output (Dout) when the electric analog signal goes beyond a predetermined detection threshold. Also included in the device is a radio transmitter which is configured to transmit a radio detection signal (RS) in response to the detection output. Further, the device includes a power supply configured to provide an electric power to the signal processing circuit and the radio transmitter; and a power generating element which converts an external energy into the electric power to be accumulated in the power supply. A controller is included to activate the radio transmitter only in response to the detection output, permitting the radio transmitter to generate the radio detection signal. Accordingly, the radio transmitter can be kept inactivated until receiving the detection output, thereby saving energy to prolong the operating life of the power supply and, i.e., the device.

In a preferred embodiment, the radio transmitter includes a regulator, a clock, a pulse generator, and a driver. The regulator is connected to receive the electric power from the power supply and is configured to supply an operating voltage for a short time period only upon receiving the detection output from the detection circuit. The clock is activated upon receiving the operating voltage from the regulator to provide a clock signal. The pulse generator is configured to generate, based upon the clock signal, short pulses identifying the presence of the detection output. The driver is activated upon receiving the operating voltage from the regulator to radiate the short pulses as the radio detection signal through an antenna. With this arrangement, the clock and the driver are made active only upon receiving the detection output for transmitting the radio detection signal. Accordingly, the driver, which is inherently the most power consuming unit in the radio transmitter, can be kept deactivated in the absence of the detection output, whereby the radio transmitter is held in a minimum power consumption mode while not receiving the detection output, which enables to further reduce a power requirement to the device and therefore prolong the effective operating time.

In order to further save the energy on the side of the signal processing circuit, the controller may be configured to give a sleep mode of operating the signal processing circuit at a reduced power, and to shift the sleep mode to a normal mode for reliable detection once there is acknowledged a slight sign leading to the detection output. In the normal mode, the signal processing circuit operates at a rated power to obtain the electric signal (Vout) of rated amplitude proportional to the rated power. In the sleep mode, the signal processing circuit operates at a reduced power to obtain the electric signal (Vout) of low amplitude proportional to the reduced electric power. In this connection, the detection circuit is configured to have a wake-up threshold which is lower than the detection threshold. The controller is designed to switch the normal mode to the sleep mode when the electric signal (Vout) of rated amplitude becomes lower than the detection threshold, and to keep the sleep mode until the electric signal of the low amplitude goes beyond the wake-up threshold. The detection output (Dout) is given when the electric signal (Vout) of rated amplitude goes beyond the detection threshold in the normal mode.

The sensor may be an infrared ray sensor for detection of a motion of the target object by monitoring a critical change of infrared ray emitted from the target object, for example, human body. The infrared ray sensor is configured to provide the sensor signal which varies in positive or negative directions in response to the motion of the target. In this instance, the detection circuit is configured to have a threshold selector which provides a detection range (A1-A2) defined by upper positive and lower negative ones of said detection threshold, and also a wake-up range (B1-B2) defined by upper positive and lower negative ones of the wake-up threshold. The detection circuit includes a comparator unit which receives the detection range and the wake-up range selectively from the threshold generator for comparison of the analog signal with the selected one of the ranges. The comparator unit generates a first signal either when the electric signal (Vout) of rated amplitude goes beyond the detection range or when the electric signal (Vout) of low amplitude goes beyond said wake-up range, and otherwise generating a second signal. The controller is configured to select the detection range in response to the first signal, and select the wake-up range in response to the second signal. The detection circuit provides the detection output only upon seeing the first signal in the normal mode. Accordingly, the sensor device can successfully detect the motion of the target object using the infrared ray sensor, while saving energy.

The detection circuit may include an output provider which is configured to generate the detection output (Dout) when receiving the first signal from the comparator unit at an input of said output provider. The input is connected to the comparator unit through a switch which is controlled by the controller to close only in response to the first signal. Thus, the output provider is protected from generating a false detection signal in the absence of the first signal, thereby improving detection reliability.

Further, the controller is connected to monitor a level of the electric power accumulated in the power supply for keeping the normal mode and disabling the sleep move while the electric power is higher than a predetermined power level. That is, while sufficient power is available, the detection circuit is kept free from a shifting between the modes, and therefore can be free from being influenced by unstable circuit operation which might appear during the transient mode shifting, assuring a reliable detection.

Still further, the sensor may be defined by a photovoltaic cell which senses an illumination level on one hand and which converts light into electrical energy for accumulating electric power in the power supply.

These and still other advantageous features of the present invention will become more apparent from the following detailed description of the preferred embodiments when taken in conjunction with the attached drawings.

DETAILED DESCRIPTION OF AN EXEMPLARY EMBODIMENT

Figure 1:
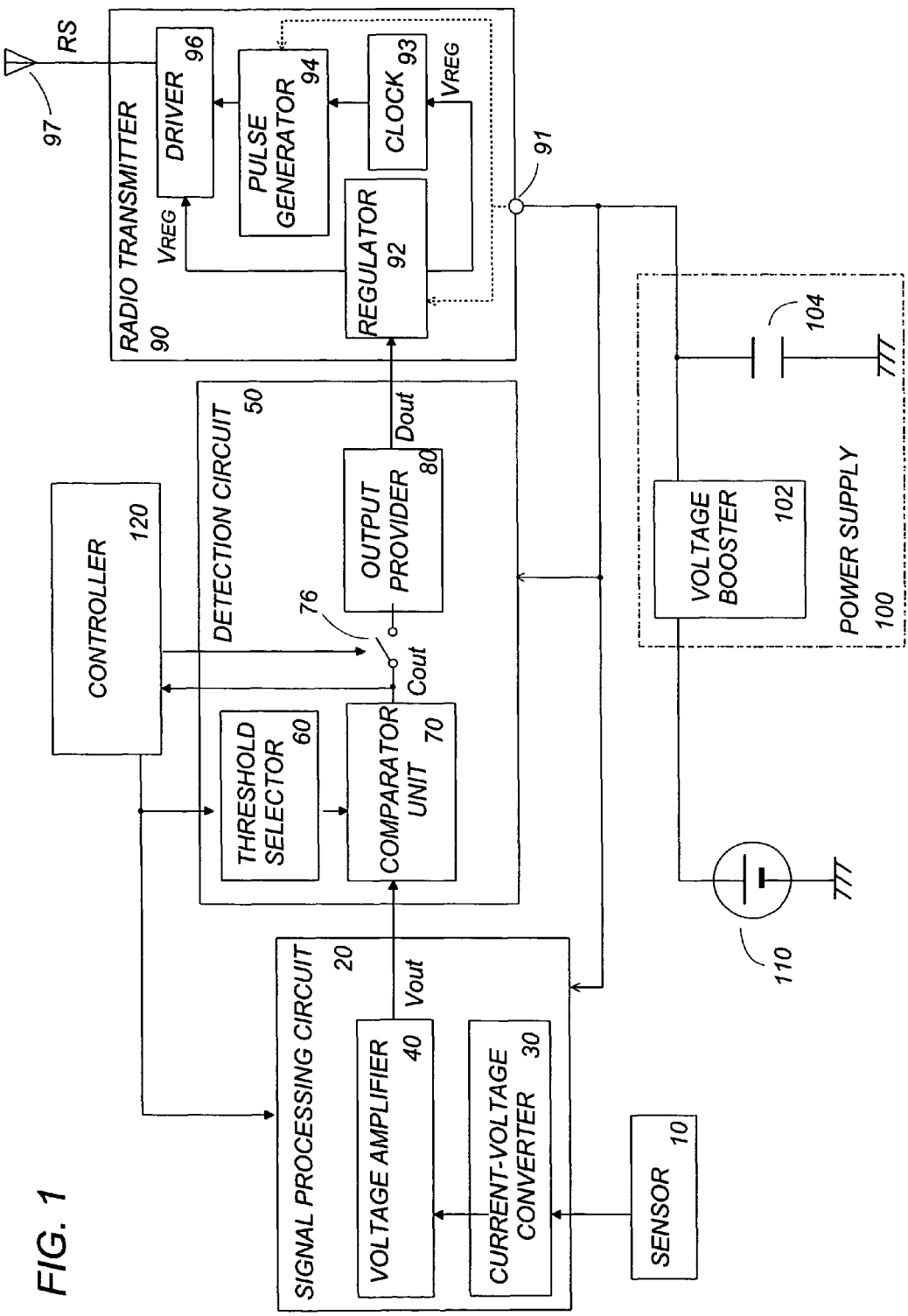
FIG. 1 is a block diagram of a sensor device in accordance with a preferred embodiment of the present invention.

Referring now to FIG. 1, there is shown a sensor device in accordance with an exemplary embodiment of the present invention. The device is specifically arranged to detect human motion, i.e. whether the human comes into or out of a surveillance area by use of an infrared ray sensor which generates an electric sensor signal responsive to infrared radiation from the human, although the present invention should not be limited to this particular instance. The infrared ray sensor 10 generates the sensor signal which varies in positive and negative directions in response to the motion of the human coming into and out of the surveillance area.

The device includes a signal processing circuit 20 which processes the sensor signal to provide an amplified analog signal, and a detection circuit 50 which compares the analog signal with predetermined criteria to provide a detection output according to the comparison result. The device further includes a radio transmitter 90 which, in response to the detection output (Dout), generates and radiates a radio detection signal (RS) thorough an antenna 97 such that a receiver (not shown) acknowledges the detection result. A power supply 100 is included in the device to provide electric power to the signal processing circuit 20, the detection circuit 50, and the radio transmitter 90. Also included in the device is a power generating element 110 which converts external energy into the electric power to be accumulated in the power supply 100. The power generating element 110 is realized in this embodiment by a solar cell which converts the light into the electric power. A controller 120 is provided to provide a consistent detection result to the radio transmitter 90 as well as to save the energy in the absence of a critical condition sensed by the sensor, the details of which will be discussed later.

The signal processing circuit 20 is composed of a current-voltage converter 30 converting the current signal, i.e., the sensor signal output from the sensor 10 into a corresponding voltage signal, and a voltage amplifier 40 which amplifies the voltage signal into the amplified analog signal (Vout) of which amplitude varies depending upon an amplification factor instructed from the controller 120. In this connection, the controller 120 provides a normal mode of operating the signal processing circuit 20 at a rated power, and a sleep mode of operating the signal processing circuit 20 at a reduced power for saving the energy. In the normal mode, the signal processing circuit 20 operates at a high amplification factor and therefore at a high power consumption to provide the analog signal (Vout) of rated amplitude. In the sleep mode, the signal processing circuit 20 operates at a low amplification factor and therefore at a low power consumption to provide the analog signal (Vout) of reduced amplitude.

Figure 2:
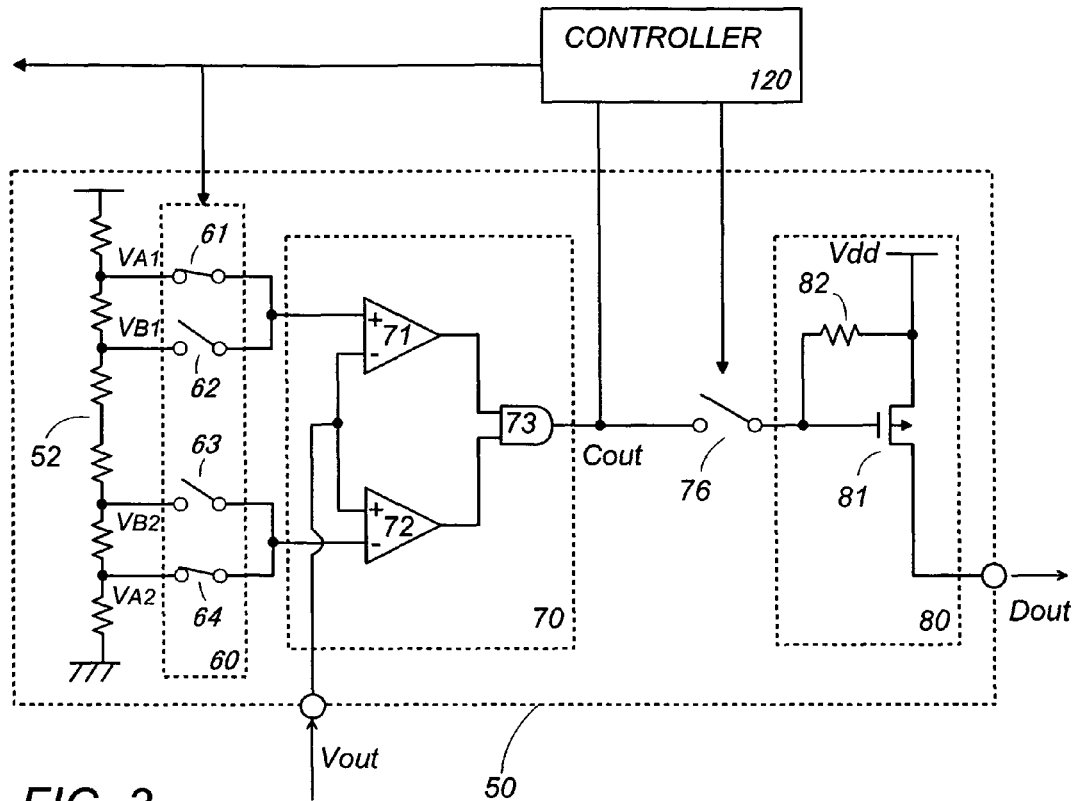
FIG. 2 is a circuit diagram of a detection circuit employed in the above device.
Figure 3:
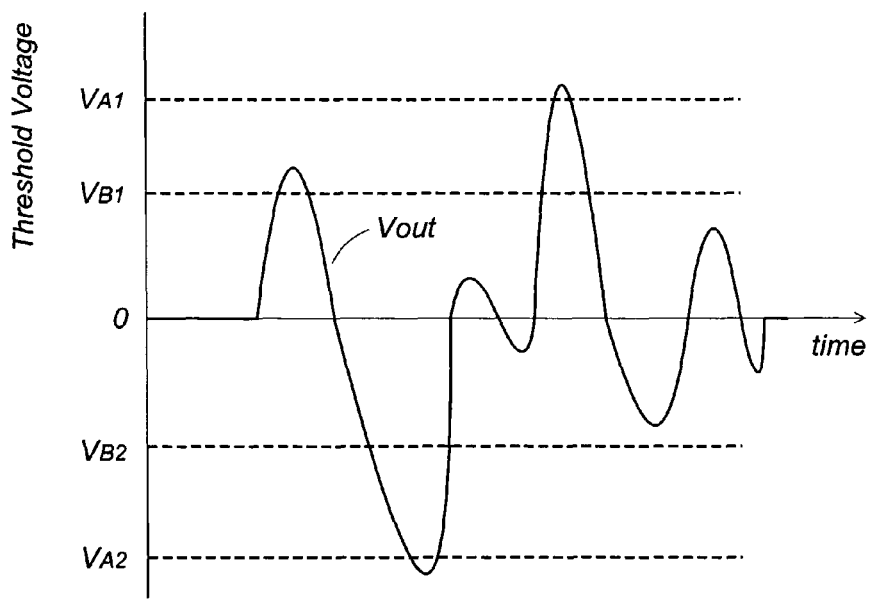
FIG. 3 is a graph illustrating an operation of the device.

As shown in FIG. 2, the detector circuit 50 has a comparator unit 70 composed of comparators 71 and 72 in order to compare the analog signal (Vout) from the signal processing circuit 20 selectively with a wide detection range (VA1 to VA2) and a narrow wake-up range (VB1 to VB2) respectively defined by predetermined thresholds which are in turn defined respectively by divided voltages from a voltage dividing network 52. The detector circuit 50 also includes a selector 60 which is composed of switches 61 to 64 in order to give the divided voltages (VA1 and VB1) selectively to non-inverting input of the comparator 71, and give the divided voltages (VA2 and VB2) selectively to the inverting input of the comparator 72. The selector 60 is controlled by the controller 120 to select the detection range (VA1 to VA2) given to the comparator unit 70 in the normal mode, and select the wake-up range (VB1 to VB2) given to the comparator unit 70 in the sleep mode. The inverting input of the comparator 71 and the non-inverting input of the comparator 72 are commonly coupled to receive the analog signal (Vout). The outputs respectively from the comparators 71 and 72 are fed into an AND-gate 73 which provides a logical product of L-level output, which is referred to as a first signal in the following description, when the signal (Vout) goes beyond the detection range (VA1 to VA2) in the normal mode or beyond the wake-up range (VB1 to VB2) in the sleep mode, as shown in FIG. 3 Otherwise, i.e., when the signal (Vout) is within the detection range in the normal mode or the wake-up range (VB1 to VB2) in the sleep mode, the AND-gate 73 provides a H-level output, which is referred to as a second signal. The controller 120 is connected to receive the output from the AND-gate 73 to select the normal mode in response to the first signal, and shift the normal mode to the sleep mode upon receiving the second signal in the normal mode for energy savings. When the signal (Vout) of the reduced amplitude goes beyond the wake-up range (VB1 to VB2) in the sleep mode, the controller 120 receives the first signal from the AND-gate 83, thereby selecting the normal mode in order to compare the signal (Vout) with the detection range (VA1 to VA2).

The AND-gate 73 is connected through a switch 76 to an output provider 80 which responds to generate the detection output (Dout). The switch 76 is controlled by the controller 120 to close only in response to the first signal, i.e., only when the signal (Vout) goes beyond the detection range (VA1 to VA2) in the normal mode. Otherwise, the switch 76 is kept open such that the output provider 80 provides no detection output. The output provider 80 includes a transistor 81 having a drain connected to a reference voltage source Vdd, and a source connected to an output terminal of the detector unit 50. A gate of the transistor 81 defines an input of the output provider 80 which is connected to receive the output from the comparator unit 70 through the switch 76. A pull-up resistor 82 is connected across the gate-drain path of the transistor 81 so that the transistor 81 generates the detection output (Dout) upon receiving the first signal (Vout), i.e., the H-level output from the AND-gate 73. In the absence of the first signal (Vout) fed to the gate of the transistor 81, it refrains from generating the detection output (Dout). The switch 76 is inserted between the AND-gate 73 and the gate of the transistor 81 in order to avoid a possibility that transistor 81 generates the detection output in the absence of the first signal. Also the switch 76 is controlled by the controller 120 to open only for a short time immediately after the controller 120 shifts the sleep mode to the normal mode and vice versa, thereby preventing the generation of the detection output (Dout) when the signal of reduced amplitude goes beyond the wake-up range in the sleep mode, and like erroneous generation of the detection output which might otherwise occur due to an abrupt voltage change possibly seen in the circuit during the transition between the two modes. Further, the output provider 80 may be configured to include a noise filter which cancels the first signal generated in the wakeup mode or the like noises even when they pass through the switch 76.

Turning back to FIG. 1, the radio transmitter 90 is configured to include a regulator 92, a clock 93, a pulse generator 94, and a driver 96. The regulator 92 is configured to supply a stable operating voltage $V_{REG}$ to the clock 93 and the driver 96 only for a short time period each upon receiving the detection output (Dout), i.e., recognition of the human presence. That is, the regulator 92 is triggered by the detection output (Dout) to supply the operating voltage $V_{REG}$ using a power supplied from the power supply 100, and otherwise supply no operating voltage at all. Upon receiving the operating voltage $V_{REG}$, the clock 93 is activated to provide a clock signal to the pulse generator 94 which generates, based upon the clock signal, short pulses identifying the presence of the detection output with or without an address of the sensor device. The driver 96, which is activated by the operating voltage $V_{REG}$ from the regulator 92 to receive the short pulses from the pulse generator 94 and radiate the short pulses as the radio detection signal (RS) through an antenna 97. The radio transmitter 90 has an power input 91 through which the electric power is constantly supplied to the regulator 92 and the pulse generator 94 so that the regulator 92 and the pulse generator 94 are ready for activating the clock 93 and the driver 96 in prompt response to the detection output (Dout) from the detection circuit 50. The driver 96 includes an amplifier and consumes more power than any other components of the radio transmitter 90, while the pulse generator 94 and the regulator 92 in its idle mode of providing no operating voltage consume less electric power. Accordingly, in the absence of the detection output (Dout), the radio transmitter 90 consumes less power and assures prolonged operating life of the sensor device. Further, it is noted that the regulator 92 supplies the operating voltage $V_{REG}$ only for the short time period each time it receives the detection output (Dout), the radio transmitter 90 is reset into a low power consumption mode immediately after transmitting the radio signal (RS). The radio signal is received at a nearby receiver for recognition of the human presence or the detected result.

The pulse generator 92 is configured to constitute a ultra wide band transmission (UWB) system, a wireless communication technology that does not use a carrier wave, but rather a train of very short pulses in the order of hundreds of picosecond range. The system therefore requires only a small electric power at the instant of transmitting the data. In the present embodiment, the data is basically composed of a one-bit signal identifying whether or not the detection output (Dout) is H-level, requiring only a very short transmission time. For example, when the radio transmitter 90 transmits the radio detection signal (RS) per ten seconds, each transmission is completed within one millisecond at an average operating current of 2 mA, consuming only 0.2 µA. In this manner, the radio transmitter 90 of the UWB system can operate in a low energy consumption mode, and therefore reducing the power requirement of the sensor system.

The power supply 100 is configured to have a voltage booster 102 which amplifies the voltage supplied from the solar cell 110, and a capacitor 104 accumulating the amplified voltage for supplying the resulting electric power to the signal processing circuit 20, the detection circuit 50, and the radio transmitter 90. For example, the above circuits 20, 50, the radio transmitter 90, and the voltage booster 102 are each designed to operate at an average consumption current of 5 µA and to require a normal operative voltage of 4V and a minimum operating voltage of 2V. In this instance, the entire system of the sensor device consumes 10 µW to 20 µW. Provided that the voltage booster 102 sees no electric conversion loss, the solar cell 110 is required to have a power generating capacity of 20 µW or more, which is easy to be accomplished only with the use of an amorphouse photovoltaic cell having an effective surface area of 3 $cm^2$ at an illumination of about 200 lux or more. Thus, the sensor device can permit the use of small-sized solar cell, and is therefore assembled into a small package.

Figure 4:
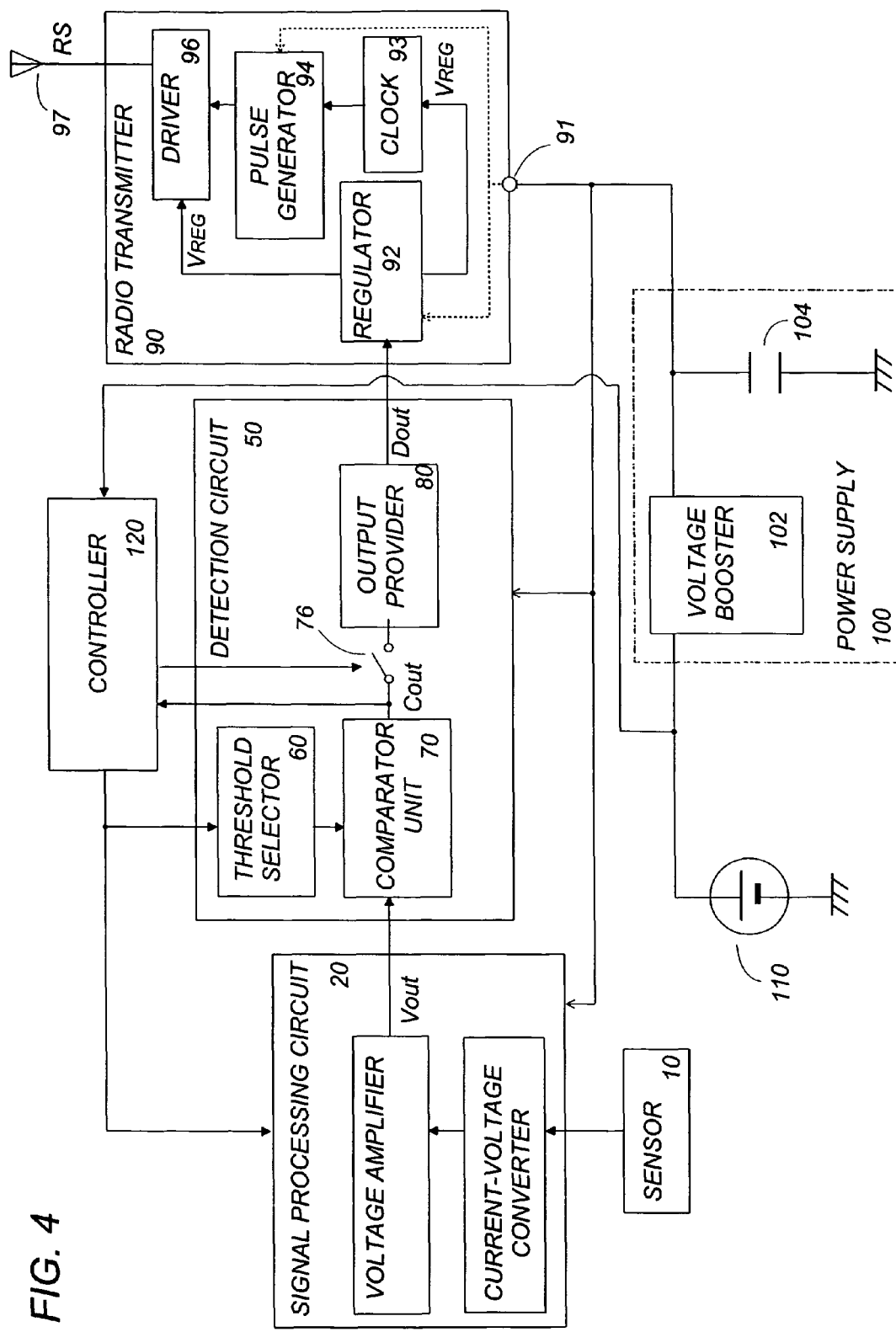
FIG. 4 is a block diagram of a sensor device in accordance with another preferred embodiment of the present invention.

FIG. 4 illustrates a sensor device in accordance with a second embodiment of the present invention which is identical to the above embodiment except that the controller 120 monitors the power level being generated at the solar cell 110 for comparison with a predetermined power level. The like parts are designated by like reference numerals, and no duplicate explanation is repeated. As long as the power level is higher than the predetermined power level, the controller 120 responds to fix the normal mode, i.e., disable the sleep mode, so as to keep the entire system awake for immediate detection. Otherwise, the controller 120 allows the shifting between the normal mode and the sleep mode for energy saving.

Figure 5:
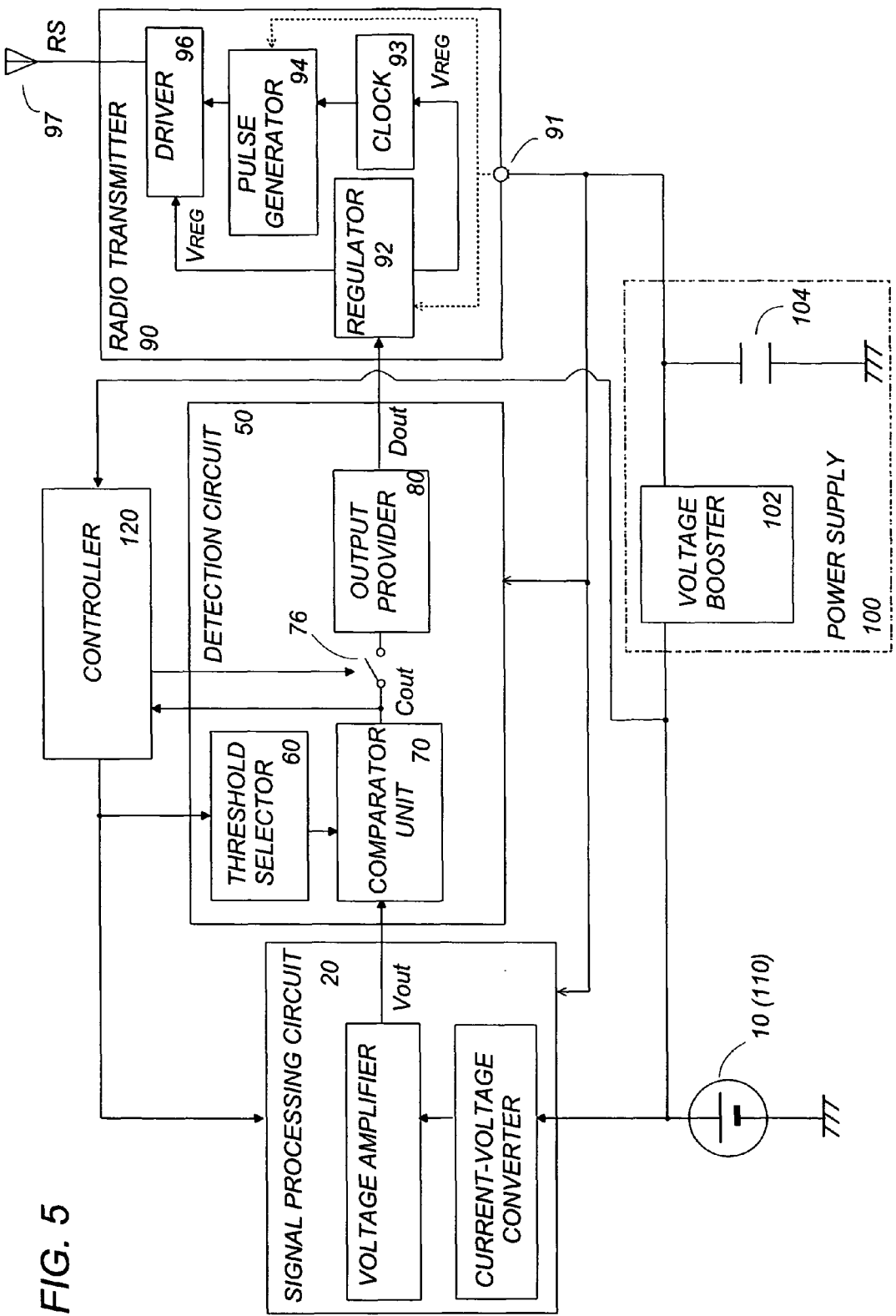
FIG. 5 is a block diagram of a sensor device in accordance with a further preferred embodiment of the present invention.

FIG. 5 illustrates a sensor device in accordance with a third embodiment of the present invention which is identical to the first embodiment except that the sensor 10 is prepared as an illumination sensor made of a photovoltaic cell. In this embodiment, the photovoltaic cell 10 is commonly utilized as the power generating element 110. Like parts are designated by like reference numerals, and no duplicated explanation is repeated here.

Although the above embodiments illustrate the sensors for detection of the human motion and for detection of the illumination level, the present invention should not be interpreted to be limited to the particular embodiments and can encompass any other sensor, such as a temperature sensor, vibration sensor or the like which gives the detection output when the sensed parameter exceeds a predetermined threshold or goes beyond a threshold range. Likewise, the power generating element may be anyone that converts the external energy, such as thermal or mechanical energy into the electric power.

The invention claimed is:

1. A wireless sensor device comprising:

a sensor configured to sense a target object and provide a sensor signal of varying levels indicative of a condition of the target object;

a signal processing circuit configured to amplify said sensor signal to provide an amplified electric analog signal;

a detection circuit configured to receive said amplified analog signal and provide a detection output (Dout) when said electric analog signal goes beyond a predetermined detection threshold;

a radio transmitter configured to transmit a radio detection signal (RS) in response to said detection output;

a power supply configured to provide an electric power to said signal processing circuit, said detection circuit, and said radio transmitter; and a power generating element converting an external energy into said electric power to be accumulated in said power supply, wherein a controller is provided to activate said radio transmitter only in response to said detection output, permitting said radio transmitter to generate said radio detection signal, and said radio transmitter comprises:

a regulator connected to receive said electric power from said power supply and configured to provide an operating voltage for a short time period only upon receiving said detection output (Dout) from said detection circuit;

a clock configured to be activated upon receiving said operating voltage to provide a clock signal;

a pulse generator configured to generate, based upon said clock signal, short pulses identifying the presence of the detection output; and a driver configured to be activated upon receiving said operating voltage from said regulator so as to radiate said short pulses as said radio detection signal through an antenna, wherein said controller is configured to provide a normal mode of operating said signal processing circuit at a rated power to obtain said electric signal (Vout) of rated amplitude proportional to said rated electric power, and a sleep mode of operating said signal processing circuit at a reduced power for obtaining said electric signal (Vout) of low amplitude proportional to said reduced electric power, said detection circuit being configured to have a wake-up threshold which is lower than said predetermined detection threshold, said controller being configured to switch said normal mode to said sleep mode when said electric signal (Vout) of rated amplitude becomes lower than said detection threshold, and to keep said sleep mode until said low amplified electric signal goes beyond said wake-up threshold, said detection circuit being configured to give said detection output (Dout) when said electric signal (Vout) of rated amplitude goes beyond said detection threshold in said normal mode, wherein said sensor is an infrared ray sensor for detection of a motion of said target object of generating infrared ray, said sensor providing said sensor signal which varies in positive or negative directions in response to the motion of said target object, said detection circuit having a threshold selector which provides a detection range (A1-A2) defined by upper positive and lower negative ones of said predetermined detection threshold, and also a wake-up range (B1-B2) defined by upper positive and lower negative ones of said wake-up threshold, said detection circuit including a comparator unit which receives said detection range and said wake-up range selectively from said threshold generator, said comparator unit generating a first signal (Cout) either when said electric signal (Vout) of rated amplitude goes beyond said detection range or when said electric signal (Vout) of low amplitude goes beyond said wake-up range, and otherwise generating a second signal (Cout), said controller selecting said detection range in response to said first signal (Cout), and selecting said wake-up range in response to said second signal (Cout), and said detection circuit providing said detection output only upon seeing said first signal (Cout) in said normal mode, and wherein said detection circuit includes an output provider configured to generate said detection output (Dout) when receiving said first signal from said comparator unit at an input of said output provider, said input being connected to receive said first signal from said comparator unit through a switch which is controlled by said controller to close only in response to said first signal.

2. The wireless sensor device as set forth in claim 1, wherein said controller is connected to monitor a level of said electric power accumulated in said power supply and to keep said normal mode and disable said sleep move while said electric power is higher than a predetermined power level.

3. The wireless sensor device as set forth in claim 1, wherein said sensor is provided for sensing an illumination level and is defined by a photovoltaic cell which converts light into electrical energy, said photovoltaic cell also defining said power generating element for accumulating the electric power into said power supply.

* * * * *